United States Patent [19]

Fluharty et al.

[11] Patent Number: 5,085,481
[45] Date of Patent: Feb. 4, 1992

[54] CONSOLE

[75] Inventors: William J. Fluharty; Thomas E. Arbisi, both of Holland, Mich.

[73] Assignee: Prince Corporation, Holland, Mich.

[21] Appl. No.: 567,789

[22] Filed: Aug. 15, 1990

[51] Int. Cl.⁵ .............................................. B60R 7/00
[52] U.S. Cl. ...................... 296/37.8; 296/37.14; 224/273
[58] Field of Search .................. 296/37.8, 37.14; 224/273, 275, 42.42, 42.45 R

[56] References Cited

U.S. PATENT DOCUMENTS

| D. 304,263 | 10/1989 | Mull | D3/40 |
|---|---|---|---|
| 3,136,461 | 6/1964 | Gregg, Jr. | 224/42.42 |
| 3,331,494 | 7/1967 | Gregg, Jr. | 224/42.42 |
| 3,799,483 | 3/1974 | Chiappinelli | 296/37.8 X |
| 3,827,772 | 8/1974 | Johnson | 312/7 |
| 3,984,161 | 10/1976 | Johnson | 224/42.42 X |
| 3,990,322 | 11/1976 | Hoffman | 296/37.14 X |
| 4,396,172 | 8/1983 | Benson | 224/42.42 X |
| 4,423,812 | 1/1984 | Sato | 296/37.8 X |
| 4,568,117 | 2/1986 | McElfish et al. | 296/37.8 |
| 4,690,241 | 9/1987 | Miyadesa | 296/37.8 X |
| 4,690,448 | 9/1987 | Fujisawa | 296/37 |
| 4,733,901 | 3/1988 | Okuyama | 296/37 |
| 4,796,791 | 1/1989 | Goss et al. | 224/42.42 X |
| 4,813,751 | 3/1989 | Fenn | 312/235 |
| 4,818,008 | 4/1989 | Cressoni | 296/37.8 |
| 4,832,241 | 5/1989 | Radcliffe | 224/275 |
| 4,848,627 | 7/1989 | Maeda et al. | 224/42.42 X |
| 4,878,438 | 11/1989 | Carver | 108/44 |
| 4,883,206 | 11/1989 | Miller | 224/153 |
| 4,915,275 | 4/1990 | Brown | 224/42.42 |
| 4,934,750 | 6/1990 | Eichler et al. | 296/37.8 |
| 4,940,275 | 7/1990 | Miki et al. | 224/273 X |

FOREIGN PATENT DOCUMENTS 180339 10/1983 Japan ................................ 296/37.8

Primary Examiner—Dennis H. Pedder
Assistant Examiner—Joseph D. Pape
Attorney, Agent, or Firm—Price, Heneveld, Cooper, DeWitt & Litton

[57] ABSTRACT

An open framework is designed with parallel curvilinear rails which form windows for receiving multiple inserts such that various console storage components to define different console arrangements can be easily constructed. Such construction allows users to select a console configuration for their use even on an individual trip basis. Also such flexibility allows dealers to provide aftermarket options for the basic console after the original vehicle purchase.

19 Claims, 2 Drawing Sheets

CONSOLE

BACKGROUND

The present invention pertains to consoles, and more specifically to an open framework for holding various convenience compartments, trays, and the like.

Conventional vehicles commonly have consoles between bucket seats since this area is conveniently located, easily accessible, and is otherwise wasted space if not used for accessories. Typically, vehicle manufacturers offer several different console designs for different option levels, and further make major styling changes each year to promote new looks. Such consoles typically are of a shell-like construction in which the outer surface is continuous and is molded of a polymeric material. The potential options with such construction are restricted due to limited interchangeability of parts and the cost of carrying additional consoles with different features in inventory. Thus, a console design which offers modern styling and flexibility in features offered is desirable.

SUMMARY OF THE PRESENT INVENTION

The system of the present invention provides an open framework which is particularly adapted for receiving multiple convenience-type components that can be inserted into the framework and securely and easily fastened thereto. In the preferred embodiment of the invention, a framework is provided having a generally curvilinear box-like structure with an open top and sides. The framework includes a front portion having an upwardly facing opening and an upright rear portion spaced a distance rearwardly of said front portion. Rails extend rearwardly from the forward portion in a curvilinear rearwardly direction to the rear structure thus creating open top and sides. Multiple components of varying size and function are insertable into the framework as desired, thus creating an easily alterable convenience center specifically tailored to an individual car buyer's wishes. The system is particularly suited for car dealerships and consumers, allowing insertable components to be easily replaced or inserted as add-ons.

These and other features, objects, and advantages of the present invention will become apparent upon reading the following description thereof together with reference to the accompanying drawings in which:

DETAILED DESCRIPTION OF PREFERRED EMBODIMENTS

Figure 1:
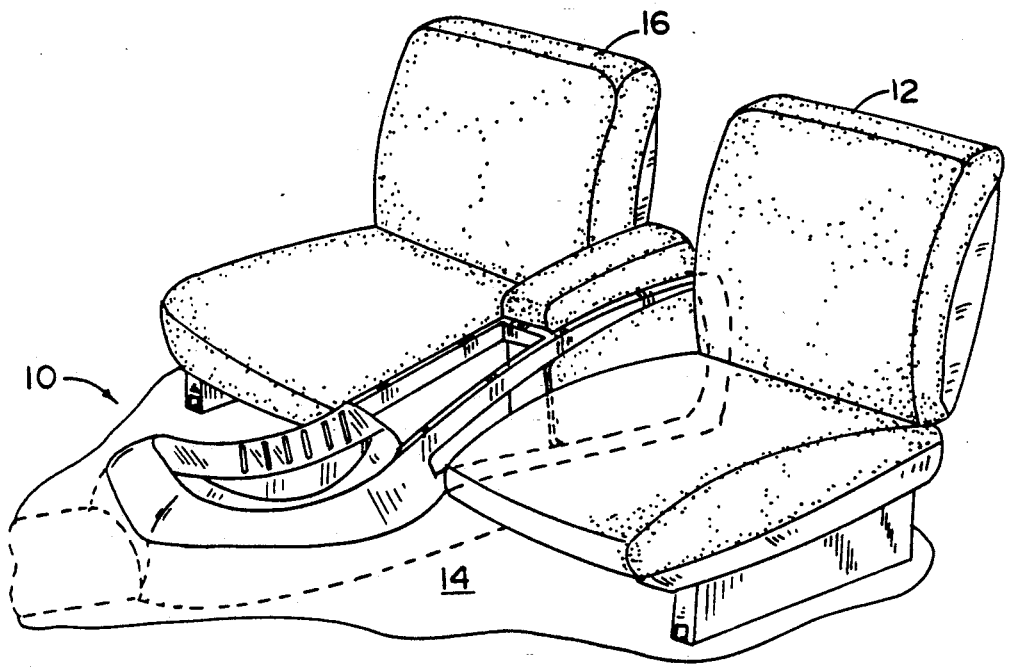
FIG. 1 is a perspective view of the console system of the present invention.
Figure 2:
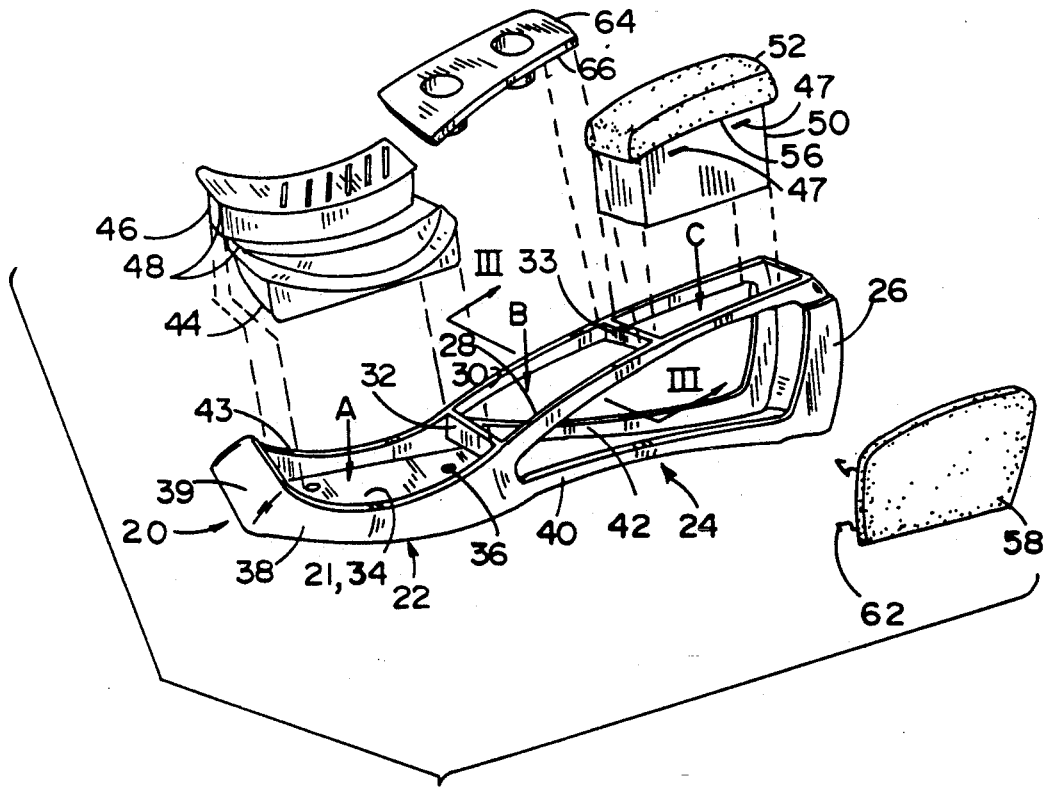
FIG. 2 is an exploded perspective view of the console system of FIG. 1.

Referring initially to FIG. 1, there is shown a console system 10 embodying the present invention and which is particularly adapted for mounting to the floor 14 of vehicle 12 between front vehicle seats 16 and 18. As best shown in FIG. 2, console system 10 comprises an open framework or structure 20 for use in removably supporting multiple insertable components. For such purpose, framework 20 has a generally curvilinear box-like shape with open top and sides, with a widened and somewhat flattened front portion 22. Console framework 20 is comprised generally of a base portion 21, a front portion 22, and a rear end portion 24 having a rear end 26. Upper rails 28 and 30 extend between the front and rear ends while central stabilizers 32 and 33 extend between rails 28 and 30. Base 21 is a pan shaped member having a substantially flat surface 34 which mateably engages vehicle floor 14. Attachment holes 36 are strategically located in base 21 to allow attachment of base 21 to floor 14 by methods commonly known in the art such as by using screws and brackets. The edges of base 21 are curved upwardly forming the front panel sides 38 and front 39 of front portion 22 and lower rails 40 and 42 of rearward portion 24. The rear edge of base 21 is bent upwardly to form rear end 26 extending generally vertically upwardly a distance.

Figure 3:
FIG. 3 is a cross-sectional view taken thru lines III—III of FIG. 2.

Upper rails 28 and 30 extend rearwardly from the upper rear corners of front portion 22 in a parallel curvilinear fashion generally horizontally and slightly upwardly to the upper edge of rear end 26 where rails 28 and 30 are supported vertically and stably spaced laterally. Extending between upper rails 28 and 30 are stabilizers 32 and 33 which extend perpendicularly from rail 28 to rail 30 dividing the upwardly facing console opening into front, middle and rear generally rectangular windows A, B, and C respectively. As shown in FIG. 3, upper rails 28 and 30 have an upwardly oriented elongated cross-section for increased strength. Said cross-section may vary as needed for strength depending upon functional requirements and the characteristics of the material chosen for the frame. The upper surfaces of front portion 22, upper rails 28, 30 and rear end 26 form a continuous and aesthetically pleasing upper perimeter 43 through which various components can be slidably inserted and to which various components mateably attach. Console 10 can be formed from a number of materials including cast or molded metal or plastic as may be desired.

Various components may be inserted into windows A, B, and C. In FIG. 2 a separate coin tray 44 and cassette holder 46 are shown which mateably fit together and slide into the top of front portion 22 through window A. A continuous lip 48 extends around the perimeter of tray 44 and holder 46 such that as tray 44 and holder 46 are placed within window A, lip 48 fits rests on the perimeter 43 of front portion 22, thus hiding unsightly gaps and mismatches due to normal part variation. Tray 44 and holder 46 may be held in place in a number of ways commonly known in the art such as by screws, adhesive, Velcro, or detents 47 which lock under central stabilizer 32, 33 and rails 28,30.

Figure 6:
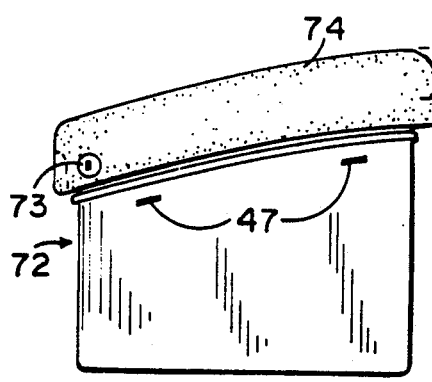
FIG. 6 is a side elevational view of a component of FIG. 5.

Another component is shown in FIG. 2 which shows a container 50 with a cushioned lid 52 which doubles as an armrest. Container 50 mateably slides into window C. Container 50 is a box-like structure having either a pivotably opening lid 52 which opens about hinge 53 (FIG. 4) or a slidably opening lid 74 (FIG. 6) to provide access to the interior storage chamber 54. Container 50 is designed similarly to tray 44 and holder 46 in that container 50 is provided with a lip 56 for aesthetics and has a retaining means such as screws, adhesive, Velcro or detents. Storage chamber 54 may be of various depths and have various internal subcompartments for storing a variety of items as is commonly known in the art.

A short side panel 58 (FIG. 2) or an elongated side panel 60 (FIG. 5) can be installed on the side of console 10 below upper rails 28, 30 and above lower rails 40, 42 to improve the appearance of and close-off the open sides portion of console 10. In its installed position, shortened side panel 58 extends along the side of console 10 downwardly from upper rails 28, 30 and rearwardly of central stabilizer 33. Alternatively elongated side panel 60 closes off the full opening along side of console 10. Both panels 58, 60 include attachments means commonly known in the art such as fasteners 62 which snap lock into apertures in upper and lower rails 28, 30, 40 and 42.

Window B can be left open for holding purses and such, or can be filled with components similar to Windows A, and C. In FIG. 2, a cupholder as is commonly known in the art such as cupholder 64 is shown inserted into the middle window B of console 10. In the preferred embodiment, cupholder 64 snaps in place and includes a lip 66 similar to tray 44 and holder 46, to close off unsightly gaps between cupholder 64 and support the cupholder on the rails 28, 30 of container 50.

Figure 5:
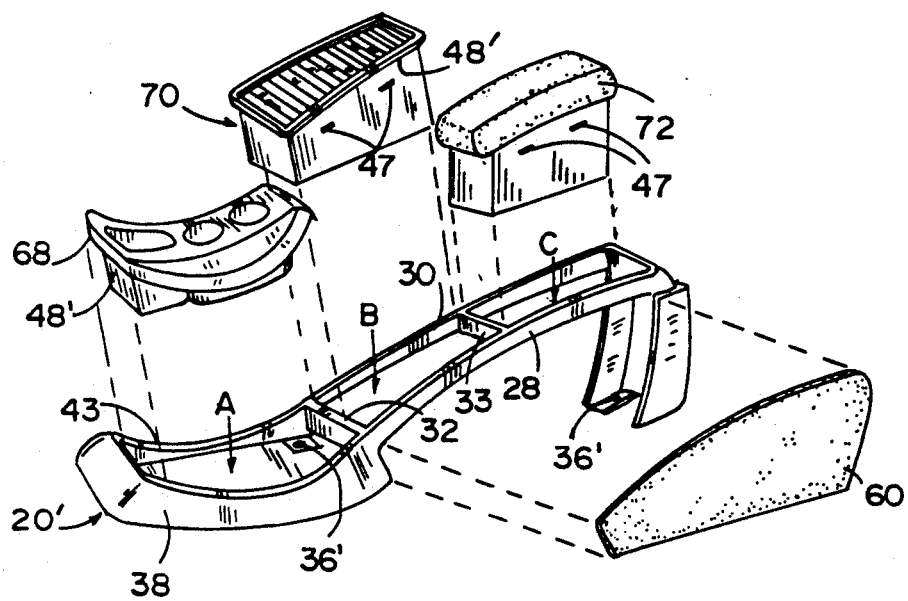
FIG. 5 is an exploded perspective view of a second embodiment of the invention.
Figure 7:
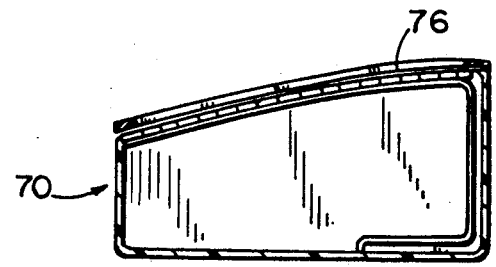
FIG. 7 is a side elevational view of another component of FIG. 5.
Figure 4:
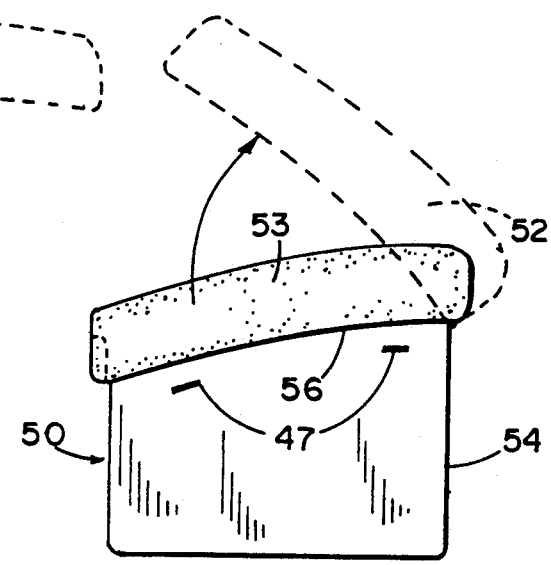
FIG. 4 is a side elevational view of a component of FIG. 2.

A second embodiment illustrating the flexibility of console 10 is shown in FIG. 5. In FIG. 5, console 10 includes a combination cupholder and change tray 68 mounted in window A, a roll-top covered container 70 mounted in window B, and a slidingly covered lockable container 72 having a lock 73 mounted in Window C. Each of these components includes a retaining means commonly known in the art and a peripheral lip 48'. Various covering methods may be used such as sliding lids 74 (FIG. 6) and 76 (FIG. 7) or hinged lid 52 (FIG. 4). Further, frame 20' is shown absent a base 21, thus depending upon attachment 36' for rigidity and spacing.

Thus, it is seen with system of the present invention, a highly useful, convenient, and flexible console arrangement is provided for storage of personal items and for convenience of the user. In the preferred embodiment, the system is particularly shaped with curvilinear rails which provide modernistic styling and also open framework functionally to assist in retaining the various insertable components. It will become apparent to those skilled in the art that various modifications to the preferred embodiment of the invention can be made without departing from the spirit or scope thereof as defined by the appended claims.

The embodiments of the invention in which an exclusive property of privilege is claimed are defined as follows.

1. A console arrangement for use in a vehicle comprising:
   an open framework including a front portion having an upwardly facing opening and further including an upright rear end portion spaced a distance rearward of said front portion; said framework further defined by at least two rails of narrow vertical and horizontal dimension and extending between said front position and said rear end portion interconnecting said front portion and said rear end portion to form a box-like structure having an open space within the confines of said framework and an open top and open sides with a smooth upper perimeter surface; said open top defining an upwardly facing opening means of a predetermined configuration;
   a plurality of separate, different, insertable components having different configurations and which can be inserted mateably into said opening means of said framework within said perimeter surface;
   at least one of said components extending into said open space;
   means for securing said components to said framework within said opening means; and
   means for securing said framework to a vehicle.

2. A system as defined in claim 1 wherein said framework includes a base which mateably engages the floor of a vehicle, said base integrally mating with said front portion and said rear end portion; and
   said means for securing said framework to said vehicle cooperates with said base.

3. A system as defined in claim 2 wherein said base includes lower rails integrally interconnecting said front portion with said rear end portion.

4. A system as defined in claim 3 and further including side panels which attach to said framework to close-off a part of said open sides of said framework.

5. A system as defined in claim 3 wherein side panels attach to said framework to fully close-off said open side of said framework.

6. A system as defined by claim 1 wherein said at least one component is removable.

7. A system as defined by claim 1 wherein said components are held in place by detents.

8. A system as defined by claim 1 wherein at least one of said components is a compartment including a cushioned lid movably mounted to said compartment permitting said lid to close on said compartment and also to act as an armrest when closed.

9. A system for holding multiple components in a vehicle comprising:
   a front member having an upwardly facing opening; a rear member spaced a distance rearward of said front member and in substantial alignment therewith;
   a plurality of curvilinear rails of narrow, vertical and horizontal dimension integrally extending from said front member to said rear member and forming an open framework having upwardly facing window means and an open space below said window means for receiving and holding components securely in an installed position on said rails;
   a plurality of separate, different, insertable components having differently shaped configurations which mateably set within said window means defined by said rails and are held in place by said rails;
   at least one of said components extending downwardly into said open space;
   means for securing said components to said rails within said window means; and
   means for securing said rails to a vehicle.

10. A system as defined in claim 9 wherein said plurality of curvilinear rails includes upper and lower rails with said lower rails defining a base integrally mating with said front member and said rear member and which mateably engages the floor of a vehicle; and wherein said means securing said framework to said vehicle cooperates with said base.

11. A system as defined in claim 10 wherein said upper rails integrally interconnect said front member with said rear member to form open sides with said lower ones of said rails.

12. A convenience center for use in a vehicle which includes multiple insertable components comprising:
- a base portion adapted to mateably rest on and be affixed to a vehicle;
- a center structure including a front portion connected to the front of said base and extending upwardly and further including a rear portion connected to the rear of said base and extending upwardly; said center structure further including two curvilinear rails of narrow vertical and horizontal dimension extending from said front portion to said rear portion forming a continuous upper perimeter to define a box-like structure having an open top and open sides with an open space below said top and between sides; said open top defining an upwardly facing opening means of a predetermined configuration;
- a plurality of separate, different, insertable components which are insertable into said opening means of said open top;
- at least one of said components extending downwardly from said top into said open space;
- means for retaining said components in said center structure within said opening means; and
- means to retain said base to a vehicle.

13. The system as defined in claim 1 wherein said plurality of separate insertable components are shaped to be individually dropped into said opening means of said open framework, each component including a lip means so that said components are removably supported in a hanging fashion from said perimeter surface to provide storage of personal items for convenience of the user.

14. The system as defined in claim 9 wherein said plurality of separate insertable components are shaped to be individually dropped into said window means of said open framework, each component including a lip means so that said components are removably supported in a hanging fashion from said rails to provide storage of personal items for convenience of the user.

15. The system as defined in claim 12 wherein said plurality of separate insertable components are shaped to be individually dropped into said opening means of said open top, each component including a lip means so that said components are removably supported in a hanging fashion from said upper perimeter of the center structure to provide storage for personal items for the convenience of the user.

16. A center console for use between the seats of a vehicle comprising:
- a console frame including a pair of spaced curvilinear upper rails and a pair of spaced lower rails, said upper rails including cross members defining a plurality of upwardly facing openings each having a different predetermined configuration, said console frame further including upright support structure extending at a front and a rear of said upper and lower rails which extends between said upper and lower rails for interconnecting said upper and lower rails to form a box-like open structure having open sides and an open space below said upper rails and said sides; and
- a plurality of separate insertable components, one for each of said openings, and configured to be received in one of said openings of said frame and supported in an installed position by said upper rails; at least one of said components extending downwardly into said open space.

17. The system as defined by claim 13 wherein said means for securing said components to said framework is fastenerless.

18. The system as defined by claim 14 wherein said means for securing said components to said rails is fastenerless.

19. The system as defined by claim 15 wherein said means for securing said components to said center structure is fastenerless.

* * * * *

UNITED STATES PATENT AND TRADEMARK OFFICE
CERTIFICATE OF CORRECTION

PATENT NO. : 5,085,481                  Page 1 of 2

DATED       :    February 4, 1992

INVENTOR(S) :   William J. Fluharty et al.

It is certified that error appears in the above-identified patent and that said Letters Patent is hereby corrected as shown below:

Column 1, line 54:
Before "lines" insert --section--;

Column 3, line 15:
"attachments" should be --attachment--;

Column 3, line 41:
After "with" insert --the--;

Column 3, claim 1, line 64:
"position" should be --portion--;

Column 4, claim 2, line 12:
"in" should be --by--;

Column 4, claim 3, line 18:
"in" should be --by--;

UNITED STATES PATENT AND TRADEMARK OFFICE
CERTIFICATE OF CORRECTION

PATENT NO. : 5,085,481

DATED : February 4, 1992

INVENTOR(S) : William J. Fluharty et al.

It is certified that error appears in the above-identified patent and that said Letters Patent is hereby corrected as shown below:

Column 4, claim 4, line 22:
"in" should be --by--;

Column 4, claim 5, line 24:
"in" should be --by--;

Column 4, claim 10, line 65:
After "means" insert --for--;

Column 5, claim 12, line 17:
After "between" insert --said--;

Column 6, claim 15, line 9:
"for personal items for the convenience" should be
--of personal items for convenience--.

Signed and Sealed this

Twenty-fourth Day of August, 1993

Attest:

BRUCE LEHMAN

*Attesting Officer*   *Commissioner of Patents and Trademarks*